United States Patent [19]

Miyake et al.

[11] Patent Number: 4,628,178

[45] Date of Patent: Dec. 9, 1986

[54] TOOL FOR WARM AND HOT FORGINGS AND PROCESS FOR MANUFACTURING THE SAME

[75] Inventors: Masaya Miyake; Yasuhiro Saito; Matsuo Higuchi, all of Itami, Japan

[73] Assignee: Sumitomo Electric Industries, Ltd., Osaka, Japan

[21] Appl. No.: 737,397

[22] Filed: May 23, 1985

[30] Foreign Application Priority Data

| May 29, 1984 | [JP] | Japan | 59-110568 |
| Oct. 23, 1984 | [JP] | Japan | 59-223785 |
| Nov. 7, 1984 | [JP] | Japan | 59-234563 |
| Feb. 4, 1985 | [JP] | Japan | 60-20230 |

[51] Int. Cl.$^4$ .................................................. B23K 26/00
[52] U.S. Cl. ....................... 219/121 LD; 219/121 ED; 219/118; 219/77
[58] Field of Search ................. 219/121 LC, 121 LD, 219/121 EC, 121 ED, 121 L, 121 LM, 121 EB, 121 EM, 118, 77

[56] References Cited

U.S. PATENT DOCUMENTS 4,145,094  3/1979  Vezirian ................... 219/121 ED X
4,306,139  12/1981 Shinozaki et al. ............ 219/118 X
4,492,846  1/1985  Hara et al. .................. 219/121 LC

*Primary Examiner*—C. L. Albritton
*Attorney, Agent, or Firm*—Ernest A. Beutler

[57] ABSTRACT

A tool for warm and hot forgings is proposed which is made by bonding cemented carbide to steel by applying electron beams or laser to the joint. The cemented carbide includes a hard phase of tungsten carbide and a binder metal phase containing at least one of Ni, Co and Fe, and at least one of Cr, Mo and W, the latter forming a solid solution. A process for manufacturing such a tool is also proposed in which unfocussed high-energy beams are applied to each side of the joint and focussed beams are then applied to a point slightly away from the joint toward the cemented carbide.

12 Claims, 5 Drawing Figures

TOOL FOR WARM AND HOT FORGINGS AND PROCESS FOR MANUFACTURING THE SAME

The present invention relates to tools for warm and hot forgings using cemented carbide having high performance and long life, and process for manufacturing the same.

For tools used in warm and hot forgings, high resistance to shock, abrasion and heat cracking are required. For hot forging tools such as dies and punches, die steel (SKD 61) has so far been used mainly. However, forging tools made of die steel has a short working life because they are liable to heat cracking. Further, they have a low dimensional accuracy. So the parts hot forged with such tools required grinding.

One recent tendency is to eliminate the need for such an after-working by precision forging. This requires the use of high performance forging tools. Conventional forging tools made of die steel are markedly liable to surface roughening, deformation and heat cracking. Also, high precision cannot be expected because of high thermal expansion of die steel. Even if high speed tool steel SKH-51 having a high hardness at high temperatures is used, long life is not achieved because of marked heat expansion and heat cracking. Cemented carbide is more desirable because its thermal expansion at high temperatures is half of that of steel. However, cemented carbides now commercially available have too low resistance to heat shock and too low toughness for use in hot forging in which they are subjected to severe conditions.

An object of the present invention is to provide a tool for warm and hot forgings which uses a cemented carbide and has high hardness at high temperature, low thermal expansion and high resistance to heat cracking and breakage.

For forging tools, resistance to abrasion is required at their tip and toughness is required at their remaining portion. It is expected that forging tools using cemented carbide at their tip and steel at the remaining portion can be used over wide ranges. However, such forging tools have not been put into practical use because of difficulty in bonding cemented carbide to steel.

If cemented carbide and steel are welded together, tungsten carbide (WC), which is the main gredient of cemented carbide, reacts with steel to form $M_6C$ phase of $(Fe_3W_3)C$. This significantly impairs the strength of alloy. Thus, brazing is usually used to bond cemented carbide to steel. In brazing, both the cemented carbide and steel are heated to 600°–900° C. Thermal stress is generated on the cemented carbide side due to difference in thermal expansion between these two materials. This thermal stress causes cracking and deformation. Bonding using electron beams has been studied, but the problem of heat cracking prevents practical use of this method.

Another object of the present invention is to provide an improved process for manufacturing tools for warm and hot forgings by bonding cemented carbide to steel.

In accordance with the present invention, there is provided a tool for warm and hot forgings manufactured by bonding cemented carbide to steel by use of high-energy beams, characterised in that the cemented carbide comprises a hard phase of tungsten carbide and 15–35% by weight of a binder metal phase, the binder metal phase comprising at least one selected from the group consisting of nickel, cobalt and iron, and at least one selected from the group consisting of chromium, molybdenum and tungsten forming a solid solution in the binder metal phase.

Other objects and features of the present invention will become apparent from the following description taken with reference to the accompanying drawings, in which.

In warm and hot forgings, because the work has a high temperature and heat is generated due to the deformation of the work, the surface temperature of a forging die increases sharply. Also, after the work has been taken out of the die, lubricant, cooling water or cooling oil is sprayed on to the die, which is cooled suddenly. Such a thermal shock can cause damage at the surface of the forging tool. Warm forging herein referred to is at about 200° C.–800° C. and hot forging is at about 800° C.–1100° C.

The inventors of the present invention have found cemented carbide which can withstand severe conditions such as rapid thermal cycling, corrosion by cooling water and abrasion by the work, and have provided a forging tool using the cemented carbide. Among parts used in hot conditions, rolls for rolling steel into wires employ cemented carbide. But, rolling rolls are used under a constant load and not subjected to so strong a thermal shock as hot forging tools are. This fact tells how severe the working conditions for forging tools are.

Toughness and resistance to heat cracking of cemented carbide can be improved by increasing the content of binder metal phase. However, this decreases the hardness of cemented carbide which is one requirement for a forging die. The inventors of the present invention aimed to find such a composition and structure of cemented carbide that the hardness at high temperatures (200° C.–1100° C.) in warm and hot forgings can be kept high at sacrifice of the hardness at normal temperatures.

Figure 1:
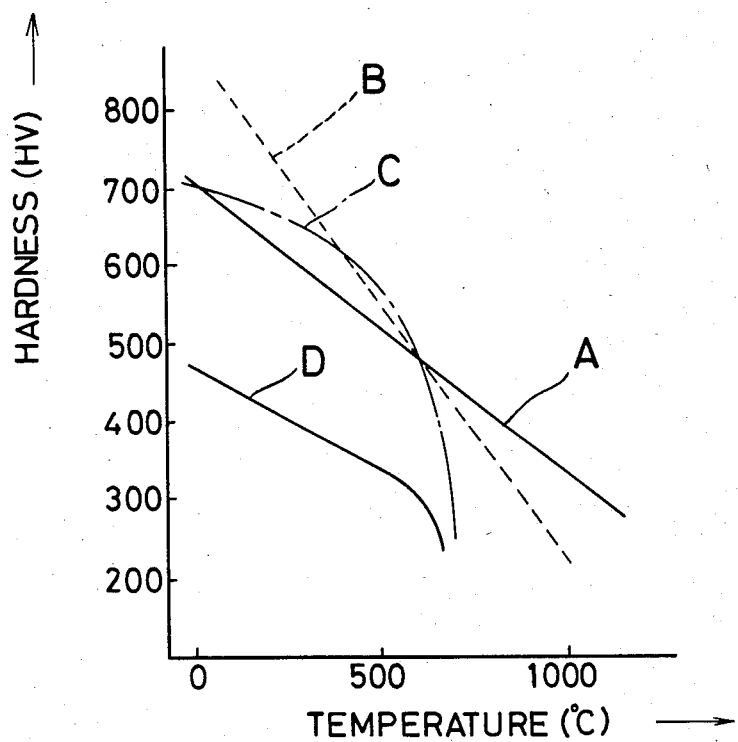
FIG. 1 is a graph showing high-temperature hardness of cemented carbide in the present invention and of conventional cemented carbides.

FIG. 1 shows the high-temperature hardness for different materials. The line A is for the cemented carbide used in the present invention, B for a conventional WC-Co cemented carbide, C for high speed tool steel SKH9, and D for die steel SKD61.

In accordance with the present invention, the carbon content of the steel material should preferably be not less than 0.2% and not more than 0.5%. If it were not within the range, the forging tool obtained would not have a sufficient bonding strength.

In accordance with the present invention, the content of the binder metal phase in the cemented carbide should preferably be 15–35% by weight. If less than 15%, the cemented carbide would have insufficient toughness. If higher than 35%, it would have insufficient hardness for use for a forging die.

The principal constituents of the binder metal phase should be at least one selected from the group consisting of nickel, cobalt and iron. At least one selected from the group consisting of chromium (Cr), molybdenum (Mo) and tungsten (W) should form a solid solution in the binder metal phase. The content of the solid solution in the binder metal phase should preferably be 0.5 to 10% by weight with respect to the binder metal phase. If over 10%, the solid solution would decrease the toughness of cemented carbide. If less than 0.5%, it would not be effective to increase the high-temperature hardness.

It was found that the addition of 0.1-5% by weight (with respect to the binder metal phase) of at least one selected from the group consisting of boron, aluminium, silicon, magnesium and calcium is effective to increase the high-temperature hardness of cemented carbide. If less than 0.1%, the addition would not be sufficiently effective. If over 5%, the cemented carbide would have insufficient toughness.

Further, it was found to be effective to increase the surface hardness and the working life to coat the abovesaid cemented carbide with a single or multiple layer comprising at least one selected from the group consisting of TiC, TiN, TiCN, TiCO, TiCNO, $Al_2O_3$, AlON, AlN, $Si_3N_4$, SiC, BN and C.

Still further, the crystalline grain size of the binder metal phase should be less than 0.3 mm to increase the working life of the forging die using the cemented carbide.

Figure 2:
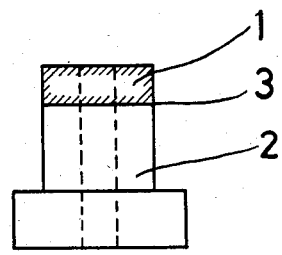
FIG. 2 is a schematic view of an example of a forging tool welded in accordance with the present invention.

As shown in FIG. 2, the forging tool according to the present invention uses the cemented carbide 1 of the abovesaid composition at a portion contacting the work and steel 2 at the remaining portion. These two materials are welded at a portion 3 by electron beams.

In accordance with the present invention, a metal film 0.1-1 mm thick of nickel, cobalt, iron or its alloy or a brazing material may be interposed between cemented carbide and steel without any change in effect.

In order to bond cemented carbide to steel without heating together, it is preferable to melt only the contact area between them by means of electron beam or laser beam. When melting with such high-energy beams, the beam-applied portion will be rapidly heated to 5,000°-10,000° C. This will form a sharp heat gradient between the melted portion and the portion 1 mm or more away from the melted portion. The heat gradient may produce a crack in the cemented carbide.

Figure 3:
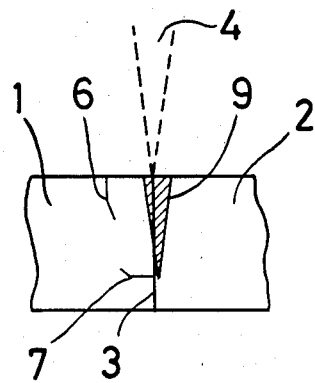
FIG. 3 is a view showing how cracks are formed when cemented carbide is welded to steel by use of electron beams.

Further, in such a bonding, the weld bead tends to swerve toward the steel side. As a result, the contact surface between the steel and the cemented carbide remains as a crack without being welded. FIG. 3 illustrates such cracks 6, 7 formed when the cemented carbide 1 and the steel material 2 are welded together. The numeral 6 shows a crack formed by heat gradient when the electron beam 4 was applied to the contact surface. The numeral 7 shows a crack formed in the cemented carbide 1 by heat stress when electron beam was applied to preferentially melt the steel side 2.

The inventors studied the optimal conditions for bonding cemented carbide to steel, in which a considerable stress occurs due to a large difference between them in the melting point. As a result, they have found a two-step process which comprises the steps of preheating the portion within some range from the interface and heating the interface.

The preheating is effective to prevent the formation of cracks due to a sharp heat gradient. Temperature is high at the welded part and low at the not-welded portion. This temperature difference produces an electric current, which deflects the electron beams used for welding. This causes the weld bead to swerve away from the contact surface. It has been found that the preheating serves also to prevent the swerving of the weld bead.

The inventors have found that a good bond can be achieved by applying not-focussed high-energy beams within the range of 10 mm to each side from the contact surface and then applying focussed beams to the cemented carbide slightly away from the contact surface. In the preheating step, electron beams should preferably be applied to the cemented carbide side to decrease the thermal stress.

Figure 4:
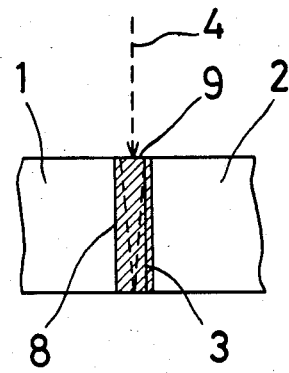
FIG. 4 is a view showing the melted portion and the beam-applied portion in the present invention.

In FIG. 4, numeral 8 shows the locus of beams and 9 shows the surface on which the weld bead is formed. If beams are applied to the cemented carbide side in the second step, a sharp heat gradient will not occur because the cemented carbide has a letter heat conductivity, so that cracks due to thermal stress will not be formed. If the beams were applied to the contact surface, they would be deflected toward the steel side, welding steel in preference to cemented carbide. Since the heat conductivity of steel is about half of that of cemented carbide, heat diffusion to the cemented carbide side will not be sufficient. Therefore, heat gradient would become sharp, causing the formation of a crack.

In accordance with the present invention, in the second step, high-energy beams are applied to the cemented carbide side 0.1 to 1.0 mm, preferably 0.2-0.7 mm, away from the interface between cemented carbide and steel. If less than 0.1 mm, the steel would be melted in preference to the cemented carbide because of a lower melting point. If over 1 mm, the amount of heat for melting the steel would be insufficient. The high-energy beams should be electron beams or laser beams.

The forging tools according to the present invention include dies, punches, knockouts, ejector pins, shear blades and rolls.

The following examples should be considered as mere exemplary of the invention.

EXAMPLE 1

At least one of Co, Ni and Fe and at least one of Cr, Mo and W were added to WC powder having a particle size of 6 microns at the mixing ratio shown in Table 1 and the mixture was water-ground. The ground mixture was formed into a cylindrical body having an outer diameter of 100 mm, an inner diameter of 40 mm and a height of 80 mm and was sintered in vacuum at 1,400° C. The cemented carbide thus obtained was used to make a forging die, which was used to forge in the upset steps a 35 mm dia. bar steel which was heated to 1,200° C. and cut. The relationship between the mixing ratio and the working life of the forging die (that is, how many pieces were forged) is shown in Table 1. This results show that the presence of Cr, Mo or W in the binder phase as a solid solution increases the working life.

TABLE 1

| Experiment No. | WC | Co | Ni | Fe | Cr | Mo | W | Working life (in pc) |
|---|---|---|---|---|---|---|---|---|
| (1) | 78 | 10 | 10 | | 2 | | | 200,000 |
| (2) | 72 | 15 | 10 | | 1 | | | 240,000 |
| (3) | 73 | 5 | 5 | 10 | | 4 | 2 | 305,000 |
| (4) | 79 | 13 | 3 | 2 | 1 | 1 | 1 | 213,000 |
| (5) | 76 | 20 | | | 2 | 1 | 1 | 175,000 |
| Compara. example | 75 | 25 | — | — | — | — | — | 19,000 |
| SKD61 | Fe—Si—Mn—Cr—Mo—V | | | | | | | 4,000 |

EXAMPLE 2

In the Experiment (1) in the Example 1, B, A, Si, Mg or Ca was added in the binder phase at the mixing ratio shown in Table 2, which also shows the relationship between the mixing ratio and the working life. This shows that the addition of such an element increases the working life.

TABLE 2

| Experiment No. | WC | Co | Ni | Cr | B | Al | Si | Mg | Ca | Working life (in pc) |
|---|---|---|---|---|---|---|---|---|---|---|
| (6) | 78 | 10 | 10 | 2 | 0.3 | — | — | — | — | 240,000 |
| (7) | 78 | 10 | 10 | 2 | — | 0.3 | — | — | — | 340,000 |
| (8) | 78 | 10 | 10 | 2 | — | — | 0.3 | — | — | 190,000 |
| (9) | 78 | 10 | 10 | 2 | — | — | — | 0.3 | — | 170,000 |
| (10) | 78 | 10 | 10 | 2 | — | 0.2 | — | — | 0.3 | 260,000 |
| Compara. example | 85 | 25 | — | — | — | — | — | — | — | 30,000 |

EXAMPLE 3

The cemented carbide obtained in the Experiment (2) in the Example 1 was welded by electron beam to steel (SKD61) to make a forging die. For comparison, another forging die was made by brazing the same cemented carbide to steel. These forging dies were compared in the working life. Table 3 shows the results.

TABLE 3

|  | Method of welding | Working life (in pc) |
|---|---|---|
| This invention | By electron beam | 230,000 |
| Compara. example | By brazing | 2,000 |

EXAMPLE 4

The cemented carbide obtained in the Experiment (1) in the Example 1 was coated with TiC, TiN, TiCo or $Al_2O_3$. Table 4 shows the working like of the forging dies made by use of the cemented carbides thus coated. This shows that the coating of such a compound increases the working life.

TABLE 4

| Experiment No. | Cemented carbide | Coating layer | | Working life (in pc) |
|---|---|---|---|---|
| (11) | WC—10Co—10Ni—2Cr | TiC | 3μ | 360,000 |
| (12) | " | TiN | 3μ | 420,000 |
| (13) | " | TiCO | 2μ | 300,000 |
| (14) | " | $Al_2O_3$ | 5μ | 400,000 |
| Compara. example | WC—25Co | TiC | 2μ | 20,000 |

EXAMPLE 5

In the Experiments (1) to (5) in the Example 1, the cemented carbide was quenched during sintering to bring the particle size of the binder metal phase to 0.3 mm. This increased the working life of the forging die by about 20%.

EXAMPLE 6

Figure 5:
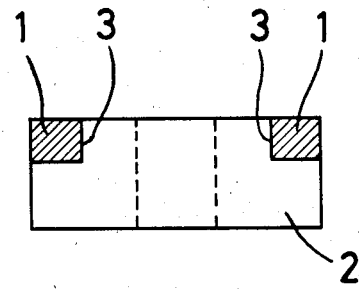
FIG. 5 is a front view of a mechanical seal ring embodying the present invention.

A ring 1 of cemented carbide (outer dia. 50 mm, inner dia, 40 mm, width 15 mm) was bonded to stainless steel 2 to make a mechanical seal, as shown in FIG. 5. The cemented carbide used included 10% of WC, 1% of Co and Cr. The cemented carbide was brazed to stainless steel for comparison. Due to thermal expansion, a crack was formed on the ring of cemented carbide.

Next, unfocussed electron beams were applied at 100 kV, 8 mA on each side of the contact surface within a range of 5 mm away from the contact surface, after which focussed electron beams were applied to the portion of cemented carbide 0.5 mm away from the joint, at 150 kV, 30 mA. Both the cemented carbide and steel were melted and they were bonded together completely. The weld bead had a width of 3 mm and a depth of 15 mm. No crack was found.

When the portions adjacent to the joint were not preheated with unfocussed electron beams, the beams were deflected toward the stainless steel side, forming a weld bead on the stainless steel side with a crack formed on the cemented carbide side.

EXAMPLE 7

In the same manner as mentioned above, cemented carbide (WC-10% Co-10% Ni) was bonded to the following steels having different carbon contents to make a punch. The punches thus made were tested at 1,050° C. The working life is shown in the table 5.

TABLE 5

| Steel | Carbon Content | Working Life (in pc) |
|---|---|---|
| SNC22 | 0.12–0.18% | 20,000 |
| SKD 1 | 1.8–2.4% | 30,000 |
| SKD 5 | 0.25–0.35% | 100,000 |
| SKD 6 | 0.32–0.42% | 120,000 |

The results show that the punches using steels having a carbon content of 0.2 to 0.5% have a long working life.

What we claim:

1. A tool for warm and hot forgings manufactured by bonding cemented carbide to steel by use of high-energy beams, characterised in that said cemented carbide comprises a hard phase of tungsten carbide and 15–35% by weight of a binder metal phase, said binder metal phase comprising at least one selected from the group consisting of nickel, cobalt and iron, and at least one selected from the group consisting of chromium, molybdenum and tungsten forming a solid solution in said binder metal phase.

2. The tool as claimed in claim 1, wherein the content of said solid solution is 0.5–10% by weight with respect to said binder metal phase.

3. The tool as claimed in claim 1, wherein said binder metal phase further comprises 0.1–5% by weight (with respect to said binder metal phase) of at least one selected from the group consisting of boron, aluminium, silicon, magnesium and calcium.

4. The tool as claimed in claim 1, wherein the carbon content of said steel is 0.2–0.5% by weight.

5. The tool as claimed in claim 1, wherein said cemented carbide is bonded to said steel with a metal film 0.1-1 mm thick interposed therebetween.

6. The tool as claimed in claim 1, wherein said cemented carbide is coated with at least one selected from the group consisting of TiC, TiN, TiCN, TiCO, TiCNO, $Al_2O_3$, AlON, AlN, $Si_3N_4$, SiC, BN and C.

7. The tool as claimed in claim 1, wherein said binder metal phase has a partical size of not larger than 0.3 mm.

8. The tool as claimed in claim 1, wherein said high-energy beam is electron beam.

9. The tool as claimed in claim 1, wherein said high-energy beam is laser beam.

10. A process for manufacturing a tool for warm and hot forgings as claimed in claim 1, said process comprising the steps of applying unfocussed high-energy beams within a range of 10 mm to each side away from a contact surface between said cemented carbide and said steel, and applying focussed high-energy beams to a point 0.1–1.0 mm away from said contact surface toward said cemented carbide.

11. The process as claimed in claim 10, wherein said high-energy beams are electron beams.

12. The process as claimed in claim 10, wherein said high-energy beams are lazer beams.

* * * * *